Oct. 13, 1925.
W. SUDEKUM
PISTON RING
Filed Jan. 27, 1925
1,557,379
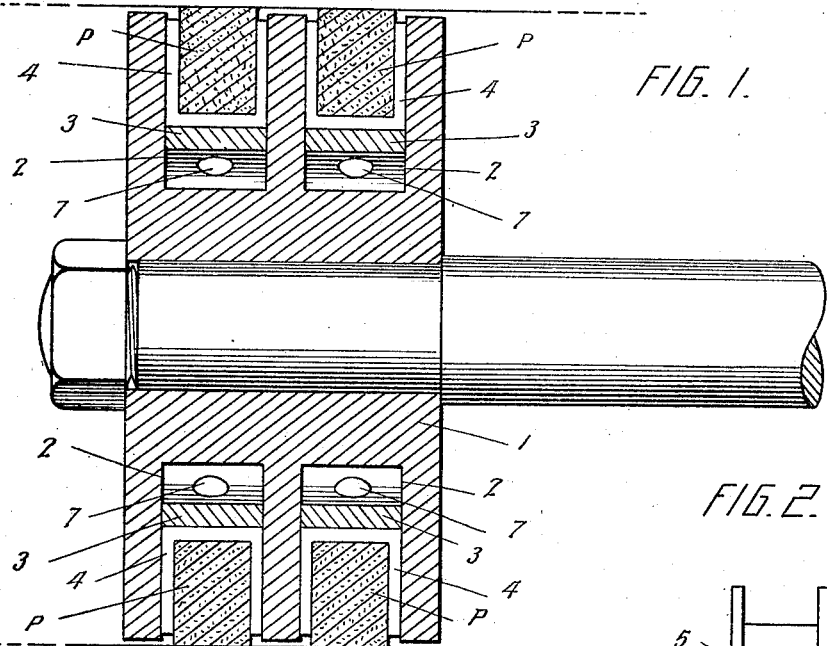
FIG. 1.
FIG. 2.
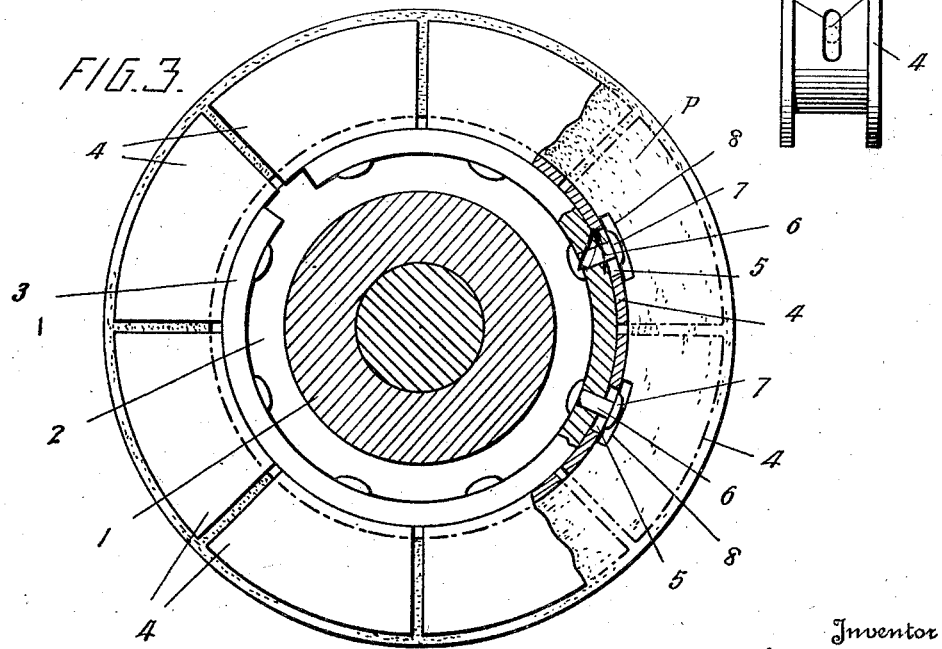
FIG. 3.
Inventor
William Sudekum
By Ogle R. Singleton
Attorney Patented Oct. 13, 1925.

1,557,379

UNITED STATES PATENT OFFICE.

WILLIAM SUDEKUM, OF NASHVILLE, TENNESSEE.

PISTON RING.

Application filed January 27, 1925. Serial No. 5,095.

*To all whom it may concern:*

Be it known that I, WILLIAM SUDEKUM, a citizen of the United States, residing in the city of Nashville, in the county of Davidson, in the State of Tennessee, have invented certain new and useful Improvements in Piston Rings, of which the following is a specification.

My invention consists in a new and useful improvement in piston rings and is designed to provide expansible piston packing which is readily conformable to the contour of the chamber in which the piston operates. The particularly novel and useful feature of my device is the means which I employ for mounting the packing upon the piston and the expansive means therefor.

While I have illustrated in the drawings filed herewith one specific embodiment of my invention, it is to be distinctly understood that I do not consider my invention limited to the details of construction therein disclosed, but refer for its scope to the claims appended hereto.

In the drawings:

Fig. 1 is a longitudinal sectional view of a piston provided with my device.

Fig. 2 is a top plan view of one of the packing carriers.

Fig. 3 is a transverse section of the piston with portions broken away.

In the drawings, the numeral 1 indicates the piston head which is provided with the peripheral grooves 2 in which are received the expansible collars 3. Mounted upon these collars 3 are the series of packing carriers 4, U-shaped in cross section, and fitting snugly in the grooves 2. These carriers 4 have slots 5 in their bottoms through which are received the shanks of bolts 6 fixed on the collars 3. The heads 7 of these bolts 6 serve to retain the carriers 4 on the collars 3 and the slots 5 permit relative movement between the carriers 4 and the collars 3. A continuous band of packing P is received in the carriers 4, and is provided with suitably disposed grooves 8 to accommodate the heads 7 of the bolts 6.

From the foregoing description of the structure of my device, its operation will be obvious. I have provided continuous packing rings for the piston head which are expansible through the action of the collars 3 and adjustable to the contour of the piston chamber by reason of the use of a plurality of carriers 4 which are independently responsive to the action of the collars 3.

Having described my invention, what I claim is:

1. In a piston ring, the combination of an expansible collar; a plurality of packing carriers; sliding connections between the collar and the carriers; and a continuous ring of packing in the carriers.

2. In a piston ring, the combination of an expansible collar; a packing carrier provided with a slot; a bolt attached to said collar and passing through said slot and having a head engaging said carrier.

3. In a piston ring, the combination of a plurality of packing carriers adapted for independent adjustment relative to the piston; and expansible means adapted to secure said adjustment.

4. In a piston ring, the combination of a series of arcuate packing carriers, U-shaped in cross-section, each provided with a slot in its bottom; an expansible collar, the series being arranged peripherally of the collar; and bolts fastened to the collar, passing through the slots in the carriers, and having heads engaging the carriers.

In testimony whereof I affix my signature.

WILLIAM SUDEKUM.